(12) United States Patent
van der Geest

(10) Patent No.: US 6,403,002 B1
(45) Date of Patent: Jun. 11, 2002

(54) METHOD AND DEVICE FOR PRODUCING A SHAPED BODY

(75) Inventor: Adrianus Franciscus van der Geest, Noordwijk (NL)

(73) Assignee: Buss Muller Technology GmbH, Koblenz (DE)

( * ) Notice: Subject to any disclaimer, the term of this patent is extended or adjusted under 35 U.S.C. 154(b) by 0 days.

(21) Appl. No.: 09/423,756

(22) PCT Filed: May 12, 1998

(86) PCT No.: PCT/NL98/00261
§ 371 (c)(1),
(2), (4) Date: Dec. 3, 1999

(87) PCT Pub. No.: WO98/51477
PCT Pub. Date: Nov. 19, 1998

(30) Foreign Application Priority Data

May 14, 1997 (NL) ............................................. 1006059

(51) Int. Cl.[7] ........................ B29C 67/02; B32B 31/00
(52) U.S. Cl. ................... 264/113; 156/284; 156/305; 264/122; 264/123; 264/308
(58) Field of Search ................. 264/109, 122, 264/123, 128, 113, 301, 308, 121, 489, 492, 493; 156/284, 305

(56) References Cited

U.S. PATENT DOCUMENTS

| | | | | |
|---|---|---|---|---|
| 5,204,055 A | * | 4/1993 | Sachs et al. ................. | 264/128 |
| 5,387,380 A | * | 2/1995 | Cima et al. ................. | 264/128 |
| 5,902,441 A | * | 5/1999 | Bredt et al. ................. | 156/284 |
| 6,147,138 A | * | 11/2000 | Hochsmann et al. | |

FOREIGN PATENT DOCUMENTS

| | | |
|---|---|---|
| EP | 0 081 218 | 6/1983 |
| EP | 0 431 924 | 6/1991 |
| GB | 2 233 928 | 1/1991 |
| WO | WO 93/25336 | 12/1993 |

* cited by examiner

Primary Examiner—Mathieu D. Vargot
(74) Attorney, Agent, or Firm—Young & Thompson

(57) ABSTRACT

Method for producing a shaped body, which method comprises the following steps; (1) applying a layer of pulverulent material to a surface, (2) patternwise applying at least one liquid to the layer of pulverulent material, forming a layer of patternwise bound-together pulverulent material, (3) repeating steps (1) and (2) a predefined number of times, so that a number of successive layers of patternwise bound-together powder, is formed, the successive layers of bound-together pulverulent material together forming the shaped body, and (4) removing the unbound powder, in which the liquid comprises water and the pulverulent material comprises at least one component which forms a binder after contact with water in step (2).

9 Claims, No Drawings

METHOD AND DEVICE FOR PRODUCING A SHAPED BODY

The present invention relates to a method for producing a shaped body, which method comprises the following steps:
(1) applying a layer of pulverulent material to a surface,
(2) patternwise applying at least one liquid to the layer of pulverulent material, forming a layer of patternwise bound-together pulverulent material,
(3) repeating steps (1) and (2) a predefined number of times, so that a number of successive layers of patternwise bound-together powder, is formed, the successive layers of bound-together pulverulent material together forming the shaped body, and
(4) removing the unbound powder.

A method of this kind is known from EP-A-0,431,924. According to this European patent application, a binder is applied as the liquid to the layer of powder applied on the surface, also that a layer of patternwise bound-together powder is produced. Generally, this takes place using one or more inkjet cartridges. However, a drawback of this method is that the risk of the inkjet cartridges becoming blocked by the binder is high, certainly if a conventional inkjet printer is used. Furthermore, the use of a liquid binder has the disadvantage that it is generally slightly sticky and is therefore more difficult to handle.

The object of the present invention is to provide a solution to these problems and to this end is characterized in that the liquid comprises water and the pulverulent material comprises at least one component which forms a binder after contact with water in step (2).

The advantage of this method is that a liquid is used which is not in itself sticky, so that this liquid is easy to handle and that the risk of blockage when inkjet cartridges are used is minimal.

Of course the use of water is very environmentally friendly. In the method according to the invention all the respective components are easy to handle.

This latter factor is a major advantage in particular when using the so-called "drop-on-demand" inkjet cartridges. A drop-on-demand inkjet cartridge of this nature is known and generally comprises two rows of openings which deliver drops of the liquid to be sprayed out when an electrical signal is received.

It is known per se from EP-A-0,431,924 to use a solvent as a liquid for binding the pulverulent material. The use of water containing liquids, which with a component from the pulverulent material in step (2) form a binder is however not disclosed.

It is also known from EP-A-0,431,924 to heat the bound-together layers of powder, optionally during the application of the liquid binder, in order to promote hardening of the bound-together powder and to stimulate any chemical curing reactions which take place at elevated temperature.

In the method according to the invention, it is preferred to dry the bound-together layers of powder, by heating them, after each execution of step (1) and/or (2) or after every two or more executions of step (1) and/or (2). Particularly preferably, drying is carried out after every two to six executions of step (1) or (2). This heating can take place in numerous ways, for example by means of hot air, infrared irradiation and exposure to microwaves. However, in the context of the present invention it has been found that very good results are obtained if the drying is carried out immediately after step (1) and before step (2) by placing a heated plate on or just above the layer of pulverulent material which was applied last. The advantage of carrying out drying after step (1) is that the layer of powder which was applied last is still dry, with the result that there will be less tendency for powder to adhere to the plate when the plate is placed on the layer of powder which was applied last. The temperature to which heating is carried out is dependent on the type of powder which is employed. However, the temperature preferably lies below the melting temperature of that component of the powder composition which has the lowest melting point. The temperature will generally lie between 50 and 120° C. If desired, the heated plate can also be used to apply pressure to the applied layer of powder.

The water containing liquid which is applied to each layer of pulverulent material is preferably applied in the form of one or more fine jets of droplets. Particularly preferably, the liquid is applied in the form of a plurality of fine jets of droplets, the liquids in the different jets being of different colours. This can be achieved very effectively by making use of an inkjet printer, which are known per se.

It is also possible to produce coloured objects by making use of different colours. The locations where each specific colour is to be applied to the shaped body to be produced can be set accurately by means of correctly programming a connected computer. Techniques of this kind are known per se for inkjet printers.

In addition to water the liquid used preferably also comprises 1–50% by weight, preferably 5–25% by weight, of one or more flow promoters. Flow promoters of this nature are surface-active agents and are intended to reduce the surface tension, so that the liquid can be sprayed out of the very small openings in the inkjet cartridges in drops. Examples of suitable flow promoters are glycols, such as diethylene glycol and monoethylene glycol, and lower alkanols, such as ethanol, 1-propanol and 2-propanol. It is also possible to use combinations of two or more flow promoters of this nature. A very suitable combination is, for example, a mixture of diethylene glycol and 2-propanol.

The liquid may contain one or more colorants. If a plurality of inkjet cartridges are used, it is possible to use a plurality of liquids, the colours of which differ from one another, so that a shaped body comprising different colours can be produced.

As has been mentioned, the pulverulent material comprises a component which, as a result of coming into contact with the liquid sprayed on, forms a binder (the "adhesive component"). In addition, the powder may comprise a filler. If fillers are applied the shaped body obtained by the method according to the invention can for instance be sintered, fired or annealed, to remove the binder component and to obtain a shaped body from the material of the filler. Examples of fillers are metal powder, glass beads, glass fibres, ceramic materials, plastics, silica, sand etc. Thus it is for example possible to produce a shaped body completely consisting of glass, steel, iron etc.

Preferably the pulverulent material comprises apart from the component, which as a result of coming into contact with the water sprayed, forms a binder, a secondary binder. Such a secondary binder comprises in particular a thermosetting material or thermoplastic material. Thermosetting materials are materials which cure under the influence of heat, such as polyester powder coatings. An example of this is the polyester powder coating type LT produced by Lakfabriek Korthals B. V. Thermoplastic materials are materials which soften or melt by heating and which solidify again upon cooling.

The above thermosetting and thermoplastic materials are called secondary binders in the present context. The presence of secondary binders provides the possibility to manufacture quickly and simple a shaped body by means of the method according to the invention, which can be additionally reinforced after completion by a heat treatment.

Suitable adhesive components are in particular powders which form a binder after coming into contact with the water containing liquid. Examples are dextrin powder, (carboxy)methylcellulose, wallpaper adhesive powder, gelatin, inulin, gum arabic, polyvinyl alcohol, cement, plaster, a water soluble salt and finely ground granulated sugar. A powder in which the adhesive component is polyvinyl alcohol, (carboxy)methylcellulose, gelating and/or dextrin is preferred. Examples of suitable polyvinyl alcohol powders are completely or partially hydrolysed polyvinyl alcohols, such as those which are sold under the trade name Mowiol. Suitable grades are, for example, Mowiol 3-83, Mowiol 18-88 and Mowiol 10-98. A polyvinyl alcohol powder can be prepared by grinding a polyvinyl alcohol granulate at a temperature below the glass transition temperature of polyvinyl alcohol, for example under liquid nitrogen. An example of a commercially available dextrin is 37-LAC-19, sold by the Avebee company.

The particle size of the powder particles generally varies from 25 to 250 $\mu$m, and preferably lies between 50 and 175 $\mu$m. If the powder particles are larger than 250 $\mu$m, the dimensional accuracy of the shaped body to be formed is excessively determined by the particle size of the powder, which is generally undesirable. An example of a powder, which is generally undesirable. An example of a powder composition which can be is a composition which contains approximately 3 parts by volume of glass beads (approx. 50–100 $\mu$), 3 parts by volume of polyester powder coating and 1 part by volume of dextrin. The powder composition may also comprise polyvinyl alcohol, optionally with the addition of a secondary binder and/or a filler.

After all the layers of bound-together pulverulent material have been formed, the surplus powder which has not been bound together is removed. The shaped body obtained is then preferably placed in an oven in order to remove the liquid still present and to allow any powder components present, like a secondary binder to perform the respective function. The strength of the shaped body is optimized in this way. If desired, before or after heating in an oven, if this takes place, the shaped body may be covered on the outside with a (colourless) lacquer or varnish. As well as having an advantageous effect on the strength of the shaped body, this may also be beneficial to the colourfastness of the shaped body, particularly if it is produced in different colours.

It is preferred however to subject the combination of non-binded powder and the manufactured shaped body after step (3) to a drying treatment. Thus, a stronger produce is obtained. Hereby no danger exists for possible deformation of the shaped body during the subsequent step (4) wherein the non-bound powder is removed from the shaped body. Such a drying treatment can for example be effected in an oven.

The shaped bodies which can be produced in the method according to the invention are employed in a variety of fields. By way of example, the shaped bodies can be used to make scale models of, for example, furniture, means of transportation (cars, trains, aircrafts and the like), molecules, toys, prostheses and other implements and decorative objects. The method is also very suitable for producing models of buildings and landscapes, as well as moulds for producing, for example, plaster objects.

If the powder composition contains, in addition to the adhesive component, a filler, it may be advantageous to bind the adhesive component to the filler in advance. To this end, filler and adhesive component and any other components can be mixed in advance, in the presence of water or some other suitable liquid, after which the composition is dried and, if necessary, comminuted.

As an inkjet printer inkjet printers can be used which are known and commercially available. An example of an extremely suitable inkjet printer is the HP-deskjet 850 printer of Hewlett Packard. The ink spraying part of this printer is mounted such that this can print on top of the layer of powder. The printer comprises spraying openings for black ink and for three different base colours. By replacing the black ink by water with suitable flow promoters, it is provided for that with this device articles can be manufactured of all possible combinations of colours.

Extremely suitable inkjet cartridges are the commercially available drop-on-demand inkjet cartridges of the type HP 51645 (also of Hewlett Packard). Such an inkjet cartridge comprises about 300 spray openings.

In the following the invention will be illustrated by means of an example.

EXAMPLE

A 3D model of a Porsche was downloaded from Internet (www.3dcafe.com). With the programm 3D-Studio this model was coloured and exported to a Polyray file. From this Polyray file with a special programm 112-sections were calculated. All locations on the sections having a smaller distance than 1 mm from the closet outer side of the model obtained the colour of said closest outside. These sections were sent to a printer according to EP-A-0,431,924, The printing part being derived from a HP-deskjet. Thus, within 20 min a model of the car was printed, which car contained a completely coloured outside.

As a pulverulent material finely ground polyvinyl alcohol was used with a particle size of about 120 $\mu$m. Printing was performed with water and water based ink (HP deskjet ink) wherein the black ink was substituted by water.

What is claimed is:

1. Method for producing a shaped body, which method comprises the following steps:
   (1) applying a layer of pulverulent material to a surface,
   (2) patternwise applying at least one liquid to the layer of pulverulent material, forming a layer of patternwise bound-together pulverulent material,
   (3) repeating steps (1) and (2) a predefined number of times, so that a number of successive layers of patternwise bound-together powder, is formed, the successive layers of bound-together powder material together forming the shaped body, and
   (4) removing the unbound powder, characterized in that, the liquid comprises water and the pulverulent material comprises at least one component which forms a binder after contact with water in step (2), and in that drying is carried out after each execution of step (1) and/or (2) or after every two or more executions of step (1) and/or (2), and in that drying is carried out by placing a heated plate on or just above the layer of pulverulent material which was applied last immediately after step (1) and before step (2).

2. Method according to claim 1, characterized in that, drying is carried out after every two to six executions of step (1) and/or (2).

3. Method according to claim 1, characterized in that, the water is applied in the form of one or more fine jets of droplets.

4. Method according to claim 3, characterized in that, the water is applied in the form of a plurality of fine jets of droplets, the water in different jets being of different colours.

5. Method according to claim 1, characterized in that, the component of the pulverulent material which forms a binder with water is polyvinyl alcohol, (carboxy)methylcellulose, gelatine and/or dextrin.

6. Method according to claim 1, characterized in that, the pulverulent material in addition to the component which forms the binder comprises a filler.

7. Method according to claim 1 claims, characterized in that, the pulverulent material in addition to the component which forms a binder comprises a secondary binder.

8. Method according to claim 7, characterized in that, the secondary binder comprises a thermosetting material or a thermoplastic material.

9. Method according to claim 1, characterized in that, the combination of unbound powder and shaped body is subjected to a drying treatment before removing the unbound powder in step (4).

* * * * *